3,043,860
PREPARATION OF UNSATURATED NITRILES
Benjamin Phillips and Paul S. Starcher, Charleston, W. Va., assignors to Union Carbide Corporation, a corporation of New York
No Drawing. Filed Apr. 16, 1959, Ser. No. 806,752
6 Claims. (Cl. 260—465.2)

This invention relates in general to a novel process for the preparation of straight and branched-chain unsaturated aliphatic nitriles. In one aspect, this invention relates to a process for the preparation of nitriles having a double bond in the terminal position.

Several methods have been reported in the literature for the synthesis of unsaturated aliphatic nitriles particularly those compounds having the unsaturation in the terminal portion of the molecule. One such method involves the preparation of 5-bromo-1-pentene followed by a nucleophilic displacement of the bromide ion by the cyanide ion to give the unsaturated nitrile. Other methods are also available such as preparation of the lactam and conversion to the corresponding unsaturated nitrile by the use of dehydration catalysts at elevated temperatures. A further method involves the dehydration of cyclic oximes to the corresponding unsaturated aliphatic nitriles by heating over a phosphoric acid catalyst at temperatures of about 550° C.

Although many methods and modifications of the above typical processes have been investigated for the preparation of unsaturated aliphatic nitriles, no completely satisfactory vapor-phase method has been presented for the synthesis of such compounds from the corresponding lactones.

Accordingly, one or more of the following objects will be achieved by the practice of the instant invention. It is an object of the present invention to provide a novel process for the preparation of unsaturated aliphatic nitriles. It is also an object of the present invention to provide a process whereby unsaturated aliphatic nitriles can be prepared in one step from the corresponding lactones. A further object of the present invention is to provide a novel vapor-phase process for the preparation of aliphatic nitriles having double bonds in the terminal positions. An object of the present invention is to provide a process for the preparation of branched-chain unsaturated nitriles. Another object of the present invention is to provide a process for the preparation of unsaturated aliphatic nitriles by a process not heretofore known. These and other objects will become readily apparent to those skilled in the art in the light of the teachings herein set forth.

The broad aspect of this invention is directed to the vapor-phase synthesis of straight and branched-chain unsaturated aliphatic nitriles, and more preferably to a process for the preparation of nitriles having double bonds in the terminal positions. The compounds produced by this novel process are useful as chemical intermediates in the preparation of epoxynitriles, unsaturated acids and esters. Additionally, these compounds can be utilized in the preparation of thiodinitriles and thiodiacids by the reaction of the unsaturated nitriles with hydrogen sulfide.

The process of the present invention is directed to a one-step vapor-phase synthesis of unsaturated aliphatic nitriles having at least five carbon atoms which comprises contacting a lactone containing from five to eight carbon atoms in the ring with anhydrous ammonia over a dehydration catalyst at elevated temperatures and recovering the nitrile produced therefrom. Illustrative of the process of this invention is the following general reaction:

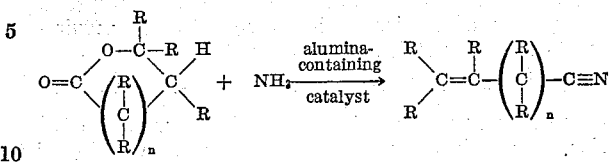

wherein R is a member selected from the group consisting of hydrogen, alkyl aryl, and cycloaliphatic groups; and n is a whole positive integer of from 2 to 5. The R groups need not be the same throughout the molecule. Preferred branched-chain unsaturated nitriles are those wherein R is an alkyl group containing from 1 to 12 carbon atoms and more preferably from 1 to 6 carbon atoms. Particularly preferred compounds are those represented by the above formula wherein both R's in the omega position of the lactone are hydrogen. These lactones undergo the aforesaid reaction to form nitriles containing a double bond in the terminal position. Typical lactones which can be employed in the practice of this invention are delta-valerolactone, gamma-methyl-delta-valerolactone, epsilon-caprolactone, beta-methyl-epsilon-caprolactone, delta-isopropyl-epsilon-caprolactone, alpha-cyclohexyl-epsilon-caprolactone, beta, delta-dimethyl-epsilon-caprolactone, zeta-enantholactone, gamma-isopropyl-zeta-enantholactone, beta-phenyl-zeta-enantholactone, eta-caprylolactone, beta, beta-diethyl-eta caprylolactone and the like which in accordance with the above reaction would give respectively, 4-pentenonitrile, 4-methyl-4-pentenonitrile, 5-hexenonitrile, 3-methyl-5-hexenonitrile, 5-isopropyl-5-hexenonitrile, 2-cyclohexyl-5-hexenonitrile, 3,5-dimethyl-5-hexenonitrile, 6-heptenonitrile, 5-isopropyl-6-heptenonitrile, 3-phenyl-6-heptenonitrile, 7-octenonitrile, 3,3-diethyl-7-octenonitrile, and the like. Lactones of less than five carbon atoms, for example, gamma-butyrolactone, when employed in the process of this invention convert to the lactam. Lactones containing more than 8 carbon atoms in the ring can also be utilized in the instant process but are less favored. Operating according to the process of this invention has the advantage over the corresponding known synthesis from the lactam in that it is not necessary to convert the lactone to the lactam prior to the vapor pyrolysis step. Thus, the unsaturated aliphatic nitriles can be produced directly from the lactone in a simple one-step process.

In a preferred embodiment of the present invention, the lactone and anhydrous ammonia were fed simultaneously into a stainless steel tube having a length to diameter ratio of approximately 36 to 1 and heated to a temperature of about 350° C. The steel tube was packed with a suitable dehydration catalyst such as activated alumina. Thereafter, the reaction product was cooled, condensed, and collected in a receiver and the organic layer separated and distilled to obtain the unsaturated aliphatic nitrile. Various modifications and refinements of the process of this invention can be made by one skilled in the art.

Molar ratios of ammonia to lactone can vary from about 1.5:1 to about 6:1 and more preferably from about 3:1 to about 5:1. While ratios above and below these amounts can also be employed, they are a less preferred embodiment of this novel process. Reaction temperatures for the vapor pyrolysis of the lactones can extend over a range of from about 325° C. to about 550° C. and preferably from about 325° C. to about 375° C. At temperatures below 325° C., the quantity of unsaturated nitrile formed was not sufficient for economical operation.

Dehydration catalysts suitable for use in the present invention can be any catalyst sufficient to effect the above reaction at the temperatures and conditions indicated and which will not adversely affect or be affected by any of the reactants or products thereof. Suitable dehydration catalysts are acid-treated clay, acid-treated silica gel, silica-alumina, activated alumina, and other acid catalysts.

If deemed advantageous, suitable inert diluents such as steam, nitrogen, and the like can likewise be employed in the practice of the instant invention. A chief requirement of any diluent is that it be inert to the reactants and products.

The starting materials of the present invention, the lactones, can be prepared by methods known to the art. For example, lactones can be prepared by the reaction of peracetic acid with cyclic ketones as described by Paul S. Starcher and Benjamin Phillips in the Journal of the American Chemical Society, 80, 4079 (1958). Cyclohexanone and its alkyl-substituted derivatives can be converted by this method to the corresponding epsilon-caprolactones. Valerolactones are conveniently obtained by dehydration of the corresponding 1,5-diols or by the aforementioned peracetic acid route from cyclopentanones. Other lactones and their substituted derivatives containing from five to eight membered rings can likewise be prepared in a similar manner.

The following example illustrates the best mode presently contemplated for the novel process of this invention:

EXAMPLE I

Preparation of 5-Hexenonitrile

Epsilon-caprolactone and anhydrous ammonia were fed simultaneously into the top of a stainless steel tube (1″ x 36″), heated to 350° C. and packed with 4 x 8 mesh acid washed alumina catalyst. The epsilon-caprolactone was added at the rate of 100 cc. per hour and the anhydrous ammonia at such a flow rate as would equal 59.6 grams hourly. The reaction was run for 2 hours and 12 minutes. The tube effluent was cooled and condensed by means of a brine-cooled condenser and collected in a receiver; the unreacted anhydrous ammonia was condensed in a "Dry Ice" trap. The effluent separated into two layers weighing 296 grams. The organic layer (139 grams) was charged to a still column packed with glass helices and equipped with a decanting head. The colorless distillate (95 grams), hexenonitrile, had a boiling point of 48° C.–50° C. at a pressure of 10 millimeters of mercury, a refractive index of 1.4280 to 1.4328 (n 30/D), and represented a yield of 58 percent of the theoretical. Calculated for $C_6H_9N$; carbon, 75.8 percent; hydrogen, 9.48 percent; nitrogen, 14.73 percent. Found: carbon, 76.47 percent; hydrogen, 9.48 percent; nitrogen 14.22 percent. Examination of an infrared spectrum of the product indicated that it consisted of approximately 90 percent of the terminal olefin (5-hexenonitrile) along wtih a small amount of the internal olefin isomer.

The foregoing detailed description has been given for clearness of understanding of the present invention and no unnecessary limitations are to be understood therefrom except as such limitations appear in the claims.

What is claimed is:

1. A vapor phase process for the preparation of an unsaturated aliphatic nitrile having the following formula:

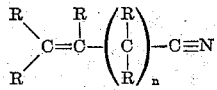

wherein R is a member selected from the group consisting of hydrogen and alkyl groups containing from 1 to 12 carbon atoms; and $n$ is a whole positive integer of from 2 to 5; which comprises reacting a lactone of the following formula:

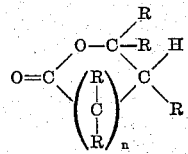

wherein both R and $n$ are as indicated above; with anhydrous ammonia in the presence of an activated alumina dehydration catalyst at a temperture of from about 325° C. to about 550° C. and recovering the nitrile therefrom.

2. A vapor-phase process for the preparation of 5-hexenonitrile which comprises reacting epsilon-caprolactone with anhydrous ammonia in the presence of an activated dehydration catalyst at a temperature of from about 325° to 550° C. and recovering 5-hexenonitrile therefrom.

3. A vapor-phase process for the preparation of 5-hexenonitrile which comprises reacting anhydrous ammonia with epsilon-caprolactone in a molar ratio of from about 1.5 to about 6 in the presence of an activated alumina catalyst at a temperature of from bout 325° C. to about 375° C. and recovering 5-hexenonitrile therefrom.

4. A process as claimed in claim 1 wherein the lactone is delta-valerolactone.

5. A process as claimed in claim 1 wherein the lactone is zeta-enantholactone.

6. A process as claimed in claim 1 wherein the lactone is eta-caprylolactone.

References Cited in the file of this patent

UNITED STATES PATENTS

| 2,375,005 | Kung | May 1, 1945 |
| 2,827,476 | Garritsen et al. | Mar. 18, 1958 |

FOREIGN PATENTS

| 812,551 | Germany | Sept. 3, 1951 |
| 1,089,759 | Germany | Sept. 29, 1960 |
| 1,233,860 | France | Oct. 12, 1960 |